March 12, 1968 F. J. PRINES ET AL 3,373,313
POWER SUPPLY SYSTEM FOR LOW-FREQUENCY AND HIGH-FREQUENCY
DISCHARGE DEVICES AND SWITCHING MEANS THEREFOR
Filed Aug. 16, 1965 2 Sheets-Sheet 1

WITNESSES:
Paul Hentzel
Bernard R. Giguere

INVENTORS
Frank J. Prines &
Eugene R. Pledger.
BY
W. D. Palmer
ATTORNEY

Fig. 4.

United States Patent Office 3,373,313
Patented Mar. 12, 1968

3,373,313
POWER SUPPLY SYSTEM FOR LOW-FREQUENCY AND HIGH-FREQUENCY DISCHARGE DEVICES AND SWITCHING MEANS THEREFOR
Frank J. Prines, Penn Hills, Pa., and Eugene R. Pledger, West Seneca, N.Y., assignors to Westinghouse Electric Corporation, Pittsburgh, Pa., a corporation of Pennsylvania
Continuation-in-part of application Ser. No. 292,853, July 5, 1963. This application Aug. 16, 1965, Ser. No. 480,084
10 Claims. (Cl. 315—86)

This application is a continuation-in-part of copending application Ser. No. 292,853, filed July 5, 1963, now abandoned by the present inventors and assigned to the present assignee.

This invention relates to power supply systems for electrical utilization devices, and more particularly to a power supply system for fluorescent lamps or the like.

Some electrical loads require high-frequency alternating current for optimum performance. For example, fluorescent lamps operate more efficiently when supplied with a high-frequency current such as 3000 c.p.s., for example, and the actual frequency of this high-frequency excitation can be varied over a wide range to obtain improved performance.

A converter can be used in such applications to convert conventional 60-cycle current to the higher desired frequency. Such a converter normally includes a means for rectifying 60-cycle alternating current and an inverter. The direct current output of the rectifier is fed into the inverter where it becomes high-frequency alternating current, preferably with a square wave form, although a sinusoidal or special wave shape can be used.

Converters of the foregoing type are well known. However, heretofore they have been operated continuously or have been turned on and off independently from the lamps. Continuous inverter operation is undesirable since there is an appreciable power consumption by the inverter during the time that the load is disconnected from its output. If the inverter is turned on or off separately from the lamps, this normally necessitates additional operating personnel. It is highly desirable to provide a means whereby the no-load power consumption can be decreased or eliminated and the operation of the inverter can be controlled by the single switch which energizes the lamps.

It is therefore an object of this invention to provide a power supply system for operating an electrical energy utilization device, which system reduces the no-load power consumption of a frequency-modifying device, such as a converter, and increases the life of such frequency-modifying device and related equipment.

An additional object of the invention is to provide, in a power supply system utilizing a converter, a remote control circuit which senses the commencement or termination of operation of an electrical utilization device and appropriately controls operation of the converter so that the operation of the device and converter is controlled from a single switch.

It is a further object of this invention to provide a normally deenergized converter which supplies the energizing high-frequency operating voltage for a fluorescent lamp.

Briefly, these and other objects which will become apparent as the description proceeds, are achieved by providing a frequency converter operable to convert conventional low frequency power into high-frequency power. A light switch is provided which is not directly connected to the converter. When the light switch is turned on the 60-cycle power energizes one or more of a bank of fluorescent lamps. The lamp current is sensed by a current sensing means which switches a control relay. The relay simultaneously activates the converter and disconnects the 60-cycle power from the lamps. The lamps continue to operate on the high-frequency power supplied thereto by the converter. When the lamps are turned off by means of the light switch, the current sensing means detects the absence of the lamp current and deactivates the converter. As an alternate energizing procedure the lamps may be initially energized by the high-frequency power from the converter instead of the 60-cycle power as described above. In the alternate procedure the 60-cycle power flows through cathode heater circuits which form a part of each lamp. The current flowing through the cathode heating circuit is detected by the current sensing means. The sensing means activates the converter in the same manner as discussed above, except the lamps are initially energized by the high-frequency voltage.

Summarizing, the present system incorporates a remote control circuit which (1) senses the application of a load to be applied on the converter, (2) turns on the converter, (3) allows the converter to continue operating until the load has been removed, (4) turns off the converter when the load has been removed, and (5) resets itself to be ready to turn on the converter when a load is again to be applied.

For a better understanding of the invention, reference is made to the accompanying drawings, wherein.

Figure 3:
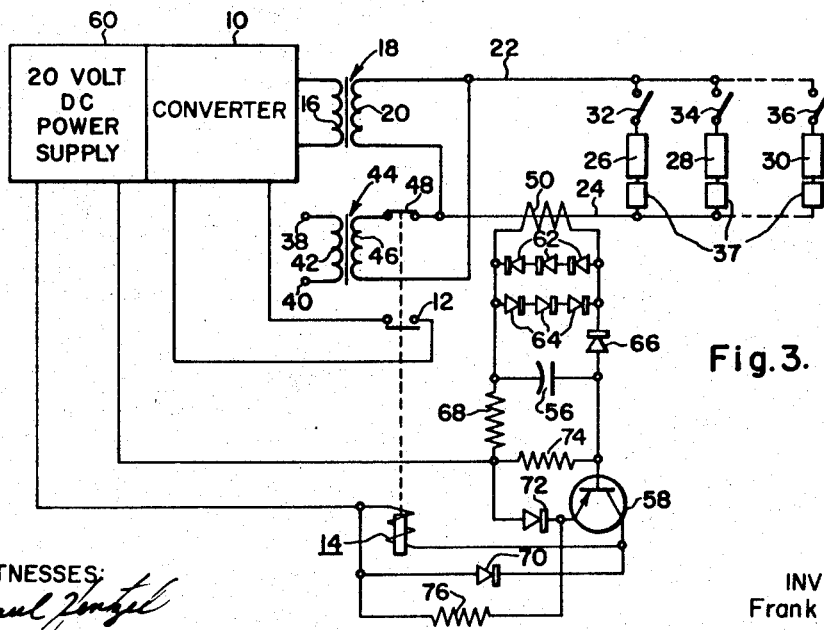
Figure 4:
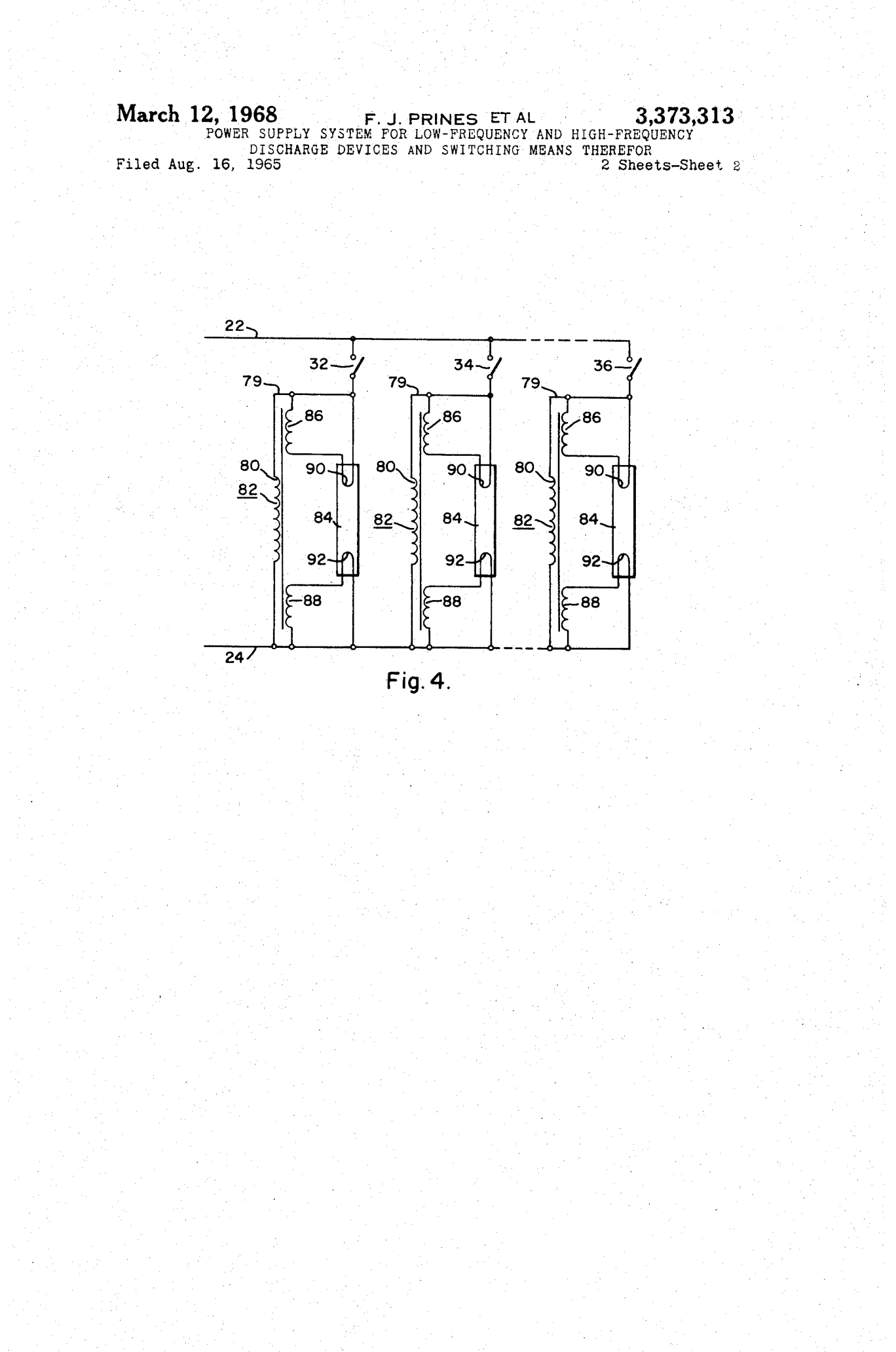

FIG. 3 is a schematic circuit diagram of still another embodiment of the power supply which employs transistorized signal amplification, together with additional circuit features which prevent excessive voltages through the transistor; and FIG. 4 is a fluorescent lamp load circuit which may be employed as the load for any of the above described circuits and which is energized by the alternate procedure, wherein the initial cathode heater currents through the lamps energize the converter.

In present practice, where high-frequency lamp operation is desired, several general systems may be employed. For example, several floors of a building may have only the conventional 60-cycle power source. To accomplish the high-frequency conversion, this 60-cycle alternating current is rectified at a central location into direct current and direct current bus lines extend to each floor. At each floor there are one or more inverters which invert this direct current into high-frequency alternating current. Each inverter then supplies a group of lamps to be operated by high-frequency current. Or, if preferred, one inverter may be used immediately following the rectification apparatus, and the high-frequency power distributed to the light sources on each floor.

Batteries may be used as a direct current source for an emergency lighting system. An inverter is then utilized to obtain alternating current from the direct current supply to operate the fluorescent lamps. It is within the contemplated scope of this invention that it can be used in any of the foregoing systems, or similar systems as would be readily apparent to those skilled in the art. The present invention can be used to control operation of the inverter itself, or, if desired, the entire frequency conversion unit.

Figure 1:
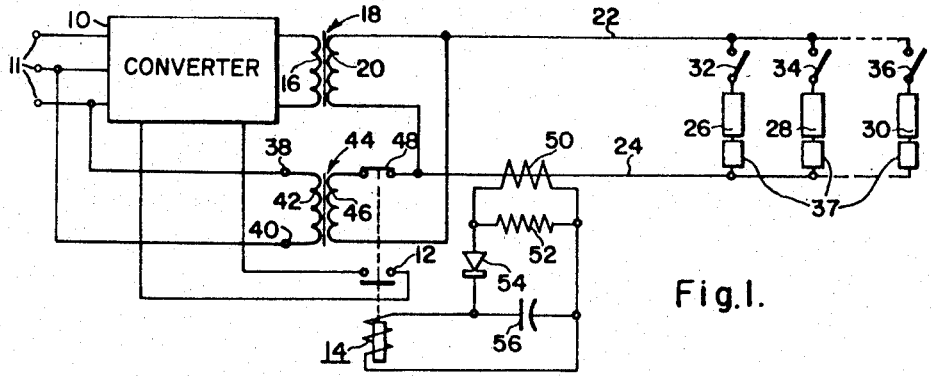
FIGURE 1 is a schematic circuit diagram of one form of power supply arranged according to the present invention.
Figure 2:
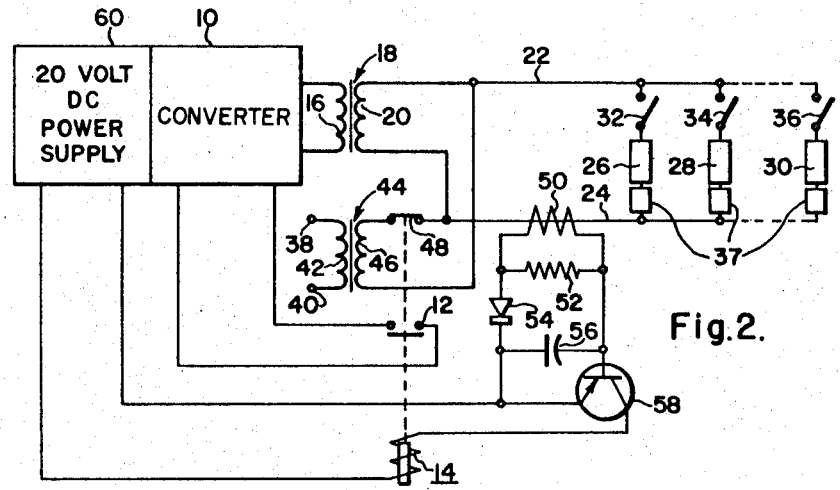
FIG. 2 is a schematic circuit diagram of another embodiment of the power supply of the present invention employing transistorized signal amplification.

Referring now to FIG. 1, there is shown a frequency conversion device or converter 10 which is controlled by a switch comprising a pair of contacts 12 on a control relay 14. Preferably, three phase power is supplied to the converter 10 at leads 11. The converters 10 in FIGS. 2 and 3 are similarly supplied with three phase power. It should be understood that a single phase three wire or two wire system can be used if desired.

The current generated by the converter 10 is directed through the primary winding 16 of an output transformer 18. The opposite ends of the secondary winding 20 on transformer 18 are connected to two current conductors 22 and 24 adapted for connection to any one of a plurality of parallel loads 26, 28 or 30 through light switches 32, 34 and 36, respectively. In the particular embodiment of the invention shown herein, the loads 26, 28 and 30 comprise fluorescent lamp circuits which operate very efficiently on a high-frequency current such as 3000-cycles per second. It is to be understood, however, that the invention is also applicable to other types of loads operated at any frequency. Each lamp is provided with a conventional current-limiting ballast 37, shown in diagrammatic form.

One phase of the three phase 60-cycle potential is applied to terminals 38 and 40 and, hence, across the primary winding 42 of transformer 44. One end of the secondary winding 46 of transformer 44 is connected to the current conductor 22. The other end of the secondary winding 46 is connected through contacts 48 on relay 14 to current conductor 24. The control relay 14 is normally deenergized with contacts 48 closed. When any one of the light switches 32, 34 or 36, is closed, the 60-cycle current energizes the corresponding lamp load 26, 28 or 30. The 60-cycle current flows from conductor 22, through the lamp load and returns through conductor 24.

Inductively associated with the current conductor 24 is a current transformer comprising a winding 50 which surrounds the conductor 24 to produce current through resistor 52 when lamp current is directed through conductor 24. As described above this current may be the 60-cycle current from the energized lamp, or in the alternate procedure this current is the 60-cycle current through the cathodes. The alternate procedure is shown and described hereinafter in connection with FIG. 4. The conductor 24 acts as the primary of the current transformer, and the winding 50 acts as the secondary in accordance with usual practice. The current through resistor 52 is rectified by diode 54 and applied to the energizing coil of relay 14, thereby causing contacts 12 to close and at substantially the same time causing contacts 48 to open. Capacitor 56 is employed in the usual manner to smooth the resulting rectified voltage before it is applied to the energizing coil for relay 14.

In the operation of the embodiment shown in FIG. 1, the contacts 48 will be closed and the contacts 12 open with all of the light switches 32, 34 and 36 open. At this time, there is no current through conductors 22 and 24. When any one or more of the switches 32, 34 or 36 is closed, however, a 60-cycle current is directed from the secondary winding 46 of transformer 44 through conductors 22 and 24 and through contacts 48. A 60-cycle current is, therefore, induced in coil 50, and this current is rectified by diode 54 and applied to the energizing coil of control relay 14. As a result, contacts 48 are opened to terminate the 60-cycle current through conductors 22 and 24 and contacts 12 are closed to energize the converter and cause a 3000-cycle current to flow through the conductors 22 and 24.

When contacts 12 close, 3000-cycle current will be passed through the conductors 22 and 24 to operate one or more of the lamps 32, 34 and 36 and to maintain relay 14 energized. Closing of more than one of the switches 32, 34 and 36 simply increased the magnitude of the 3000 cycle current in coil 50, thereby keeping the relay 14 energized. After the last of the light switches 32, 34 and 36 is opened, there is no current through conductors 22 and 24. Hence, no current is induced in the coil 50, and relay 14 becomes deenergized to again open contacts 12 and close contacts 48. When contacts 12 open, the converter is turned off and the circuit is effectively reset to sense subsequent closures of any one of the light switches 32, 34 and 36.

Reference is now made to FIG. 2, wherein the embodiment of the invention shown is generally similar to that of FIG. 1. In this circuit, a transistor 58 is connected across capacitor 56. The emitter of transistor 58 is connected, as shown, to one output terminal of a 20-volt direct current power supply 60. The power supply 60 provides the necessary direct current control power for the converter components, and in addition, powers the transistor. The collector of transistor 58 is connected to one side of the energizing coil for relay 14. The other side of this coil is connected to the other output terminal of power supply 60. With no current through conductors 22 and 24, the transistor 58 is inoperative. When, however, one of the light switches 32, 34 or 36 is closed and 60-cycle current flows through the conductors 22 and 24, the current induced in winding 50 will, after rectification by diode 54, apply a bias between the emitter and base of transistor 58 to initiate conduction therein, thereby energizing the relay 14 and closing contacts 12, while opening contacts 48 in the manner described above. As will be understood, the transistor 58, powered by the 20-volt power supply 60, acts to amplify the rectified current induced in winding 50 before application to the relay 14.

In FIG. 3 is shown another embodiment of the present invention. In this circuit the resistor 52 is replaced by sets of series-connected diodes 62 and 64, one set serving to block current in one direction between the ends of winding 50 while the other set blocks current in the other direction. Substitution of the diodes 62 and 64 results in a nearly constant voltage being applied to capacitor 56 and diode 66. Consequently, the voltage applied to the base-emitter junction of transistor 58 is nearly constant regardless of the primary current induced in winding 50, at least within the current capacity of diodes 62 and 64. Resistor 68 serves to increase the discharge time of capacitor 56, thereby keeping the transistor 58 saturated and conducting from the time that contacts 48 open to terminate the 60-cycle current through conductors 22 and 24 until contacts 12 close to start the converter 10, which then generates a 3000-cycle current through conductors 22 and 24. This current can then induce base drive for the transistor 58 through winding 50. Diode 70 is added across the energizing coil for relay 14 to protect the transistor 58 from excessive forward voltage when it goes from its conducting mode to its blocking mode. Finally, diode 72 and resistors 74 and 76 are added to provide a reverse bias on the base-emitter junction of transistor 58.

Referring now to FIG. 4, a detailed load circuit is shown which can be used in conjunction with any of the previous three embodiments. This load circuit illustrates the alternate procedure for energizing the lamps. When any of the light switches 32, 34 or 36 is closed 60-cycle current flows through the corresponding starting path 79 which is connected in parallel with the fluorescent lamps 84. The starting path 79 includes a primary coil 80 of the cathode heater transformer 82. The voltage of this 60-cycle current is approximately 20-volts and is not sufficient to energize the fluorescent lamps 84 provided in the load circuit. The fluorescent lamps have a high impedance when deenergized. The 60-cycle current is sufficient, however, to be detected by the current sensing means 50 (shown in the previous FIGS. 1–3) and activate the converter 10. The high-frequency converter voltage is approximately 350-volts and will energize the lamps 84. The high-frequency current will also pass through each connected cathode heater transformer 82. A small current is induced into the secondary windings 86 and 88 which heat filamentary electrodes 90 and 92 respectively.

This alternate procedure has several advantages. A smaller transformer 44 is permissible because only 20-volts is needed and not the energizing voltage of the lamps as described before. Further, the control relay only handles 20-volts in the alternate procedure. A smaller and less expensive relay will suffice.

It will be recognized that the objects of the invention have been achieved by providing a power supply system for operating an electrical energy utilization device, which system facilitates activating the frequency-modifying device, minimizes the no-load power consumption of the frequency-modifying device, and also increases the life of such frequency-modifying device. The fluorescent lamp loads may be energized by either the low frequency source current or the high-frequency converter current.

Although the invention has been shown in connection with certain specific embodiments, it will be readily apparent to those skilled in the art that various changes in form and arrangement of parts may be made to suit the requirements of various, similar applications without departing from the spirit and scope of the invention.

What is claimed is:
1. An electrical circuit comprising:
 (a) a source of electric current of low frequency,
 (b) a plurality of light source devices operable on said current of low frequency, and said devices operable with improved performance on current of high-frequency;
 (c) normally deactivated frequency-converting means operable to generate said current of high-frequency when actuated;
 (d) means for initiating operation of any of said devices on said current of low frequency;
 (e) current sensing means responsive to current through said initially operated devices to generate an electric output signal which is substantially constant regardless of the number of said devices initially operated;
 (f) primary switching means and secondary switching means and the operating means for said switching means;
 (g) said primary switching means, when in a closed position, actuating said frequency-converting means to cause the resulting generated high-frequency current to operate said initially operated devices;
 (h) said secondary switching means, operable when open, to terminate electric current of said low frequency through said initially operated devices; and
 (i) said operating means for said switching means responsive to the output signal of said sensing means to close said primary switching means, and at substantially the same time, open said secondary switching means.

2. The electric power supply system as specified in claim 1, wherein a signal amplifying means is associated with said sensing means, and said signal amplifying means is operable to amplify the output signals generated by said sensing means to actuate the operating means for said switching means.

3. The electric power system as specified in claim 2, wherein said signal amplifying means comprises a transistor amplifying means.

4. The electric power supply system as specified in claim 3, wherein associated with said sensing means are:
 (a) two sets of series connected diodes, each of said sets connected in parallel across an induction coil portion of said sensing means, one set of said diodes blocking the flow of current in one direction between the ends of said induction coil, and the other set of said diodes blocking the flow of current in the other direction, and said sets of diodes maintaining substantially constant voltage across the base-emitter junction of said transistor amplifying means;
 (b) a capacitor and a resistor connected across said base-emitter junction and maintaining emission of said signal during the transient period between the closing of said primary switching device and the opening of said secondary switching device; and
 (c) a diode, connected across said operating means and protecting said transistor amplifying means from excessive forward voltage.

5. An electrical comprising:
 (a) a source of electric current of low frequency;
 (b) at least one electrical utilization device operable on said current of low frequency, and said device operable with improved performance on alternating current of high-frequency;
 (c) means for initiating operation of said device on said current of low frequency;
 (d) frequency-converting means operable to receive said electric current of low frequency, convert it to, and deliver said alternating current of high-frequency to said electrical utilization device;
 (e) primary and secondary switching devices;
 (f) said primary switching device when in a closed position, actuating said frequency-converting device;
 (g) said secondary switching device, operable when open, to terminate said electric current of low frequency through said electrical utilization device;
 (h) an operating means for said switching device to close said primary switching device and at substantially the same time, open said secondary switching device; and
 (i) sensing means responsive to said current of low frequency through said electrical utilization device to actuate said operating means.

6. An electrical circuit comprising:
 (a) a source of electric current of low frequency;
 (b) at least one electrical utilization device which conducts said current of low frequency, and said device being operable on alternating current of high frequency;
 (c) means for initiating conduction of said current of low frequency through said device;
 (d) frequency-converting means operable to receive said electric current of low frequency and convert it to said alternating current of high-frequency, and then to deliver said alternating current of high-frequency to said device;
 (e) primary and secondary switching means;
 (f) said primary switching means, when in a closed position, actuating said frequency-converting means;
 (g) said secondary switching means, operable when open, to terminate said electric current of low frequency through said device;
 (h) an operating means for said switching means to close said primary switching means and at substantially the same time, open said secondary switching means; and
 (i) sensing means responsive to said current of low frequency conducted through said device to actuate said operating means.

7. An electrical circuit comprising:
 (a) a source of electric current of low frequency;
 (b) frequency-converting means operable to receive said electric current of low frequency and convert it to an alternating current of high-frequency;
 (c) at least one electrical utilization device which conducts said current of low frequency, and is energized and operable on said alternating current of high-frequency;
 (d) means for starting the conduction of said current of low frequency through said device;
 (e) primary and secondary switching means;
 (f) said primary switching means when in a closed position, actuating said frequency-converting means;
 (g) said secondary switching means, operable when open, to terminate said electric current of low frequency through said electrical utilization device;
 (h) operating means for said switching means to close said primary switching means and at substantially the same time open said secondary switching means; and (i) sensing means responsive to said current of low frequency through said electrical utilization device to actuate said operating means.

8. An electrical circuit comprising:
(a) a source of electric current of low frequency;
(b) normally deactivated frequency-converting means operable to generate a current of high-frequency when actuated;
(c) a plurality of load devices each including at least one light source, said load devices capable of conducting said current of low frequency, and said light sources operable on said current of high-frequency;
(d) means for starting the conduction of said current of low frequency through any one of said load devices;
(e) current sensing means responsive to the low frequency current through said conducting load devices to generate an electric output signal;
(f) primary switching means and secondary switching means and the operating means for said switching means;
(g) said primary switching means, when in a closed position, actuating said frequency-converting means to cause the resulting generated high-frequency current to energize and operate said light sources of said conducting load devices, said current sensing means responsive to said current of high-frequency to generate an electric output signal which is generally constant regardless of the number of said light sources which are operating;
(h) said secondary switching means, operable when open, to terminate electric current of said low frequency through said conducting load devices; and
(i) said operating means for said switching means responsive to the output signal of said sensing means to close said primary switching means, and at substantially the same time, open said secondary switching means.

9. An electric circuit comprising:
(a) a source of low-frequency current;
(b) a normally deactivated frequency-converter means adapted to receive said low frequency current and convert it to a high-frequency current when activated;
(c) a plurality of load devices which have a high impedance when unenergized and each of which have a starting path disposed electrically in parallel relationship thereto, each said starting path capable of conducting said low frequency current and each of said load devices operable on said high-frequency current;
(d) means for starting the conduction of said low frequency current through any one of said starting paths;
(e) current sensing means responsive to said low frequency current through any of said starting paths which is conducting to generate an electrical output signal;
(f) primary and secondary switching means and operating means therefor;
(g) said primary switching means operable to activate said frequency-converter means which causes the resulting high-frequency current to energize and operate all of the load devices in said starting paths which are conducting, said current sensing means responsive to said current of high-frequency to generate an electric output signal which is generally constant regardless of the number of said load devices which are operating;
(h) said secondary switching means operable to terminate said low frequency current through any of said starting paths which are conducting; and
(i) said operating means for said switching means responsive to the output signal of said sensing means to close said primary switching means, and at substantially the same time, open said secondary switching means.

10. An electrical circuit comprising:
(a) a source of electric current of low frequency;
(b) a plurality of light source devices operable on current of high-frequency, filamentary electrodes in said devices, and said filamentary electrodes adapted to conduct said current of low frequency;
(c) normally deactivated frequency-converting means operable to generate said current of high-frequency when actuated;
(d) light switch means operable when closed to pass said current of low frequency through the filamentary electrodes of a predetermined number of said devices;
(e) current sensing means responsive to current through the filamentary electrodes of any of said devices to generate an electric output signal;
(f) primary switching means and secondary switching means and the operating means for said primary and secondary switching means;
(g) said primary switching means, when in a closed position, actuating said frequency-converting means to cause the resulting generated high-frequency current to operate those of said light source devices which are controlled by said light switch means;
(h) said secondary switching means, operable when open, to terminate electric current of said low frequency through the filamentary electrodes of said light source devices which are controlled by said light switch means; and
(i) said operating means for said primary and secondary switching means responsive to the output signal of said sensing means to close said primary switching means, and at substantially the same time, open said secondary switching means.

No references cited.

JOHN W. HUCKERT, *Primary Examiner.*

R. F. POLISSACK, *Assistant Examiner.*